US010020949B2

(12) United States Patent
Hammer et al.

(10) Patent No.: US 10,020,949 B2
(45) Date of Patent: Jul. 10, 2018

(54) METHOD FOR TRANSMITTING AND RECEIVING OF AN INFORMATION-SIGNAL VIA A NETWORK, TRANSMITTER AND RECEIVER FOR APPLICATION OF METHOD AND SPLITTER UNIT FOR APPLICATION WITHIN THE NETWORK

(71) Applicant: INSTITUT FUR RUNDFUNKTECHNIK GMBH, Munich (DE)

(72) Inventors: Matthias Hammer, Munich (DE); Matthias Laabs, Munich (DE)

(73) Assignee: INSTITUT FUR RUNDFUNKTECHNIK GMBH, Munich (DE)

( * ) Notice: Subject to any disclaimer, the term of this patent is extended or adjusted under 35 U.S.C. 154(b) by 494 days.

(21) Appl. No.: 14/384,765

(22) PCT Filed: Mar. 26, 2013

(86) PCT No.: PCT/EP2013/056433
§ 371 (c)(1),
(2) Date: Sep. 12, 2014

(87) PCT Pub. No.: WO2013/144158
PCT Pub. Date: Oct. 3, 2013

(65) Prior Publication Data
US 2015/0049757 A1    Feb. 19, 2015

(30) Foreign Application Priority Data

Mar. 27, 2012 (IT) .................................. TO12A0273

(51) Int. Cl.
*H04L 12/18* (2006.01)
*H04L 29/06* (2006.01)
(Continued)

(52) U.S. Cl.
CPC ........ *H04L 12/18* (2013.01); *H04L 29/06455* (2013.01); *H04L 65/4084* (2013.01);
(Continued)

(58) Field of Classification Search
CPC ......... H04N 21/6405; H04N 21/64322; H04N 21/2381; H04N 21/2402; H04N 21/6437;
(Continued)

(56) References Cited

U.S. PATENT DOCUMENTS 6,608,480 B1    8/2003  Weyers
7,088,677 B1 *  8/2006  Burst, Jr. ............ H04L 12/5695
                                                             370/229
(Continued)

FOREIGN PATENT DOCUMENTS

CN    100421298 C    9/2008
CN    101924914 A   12/2010
(Continued)

OTHER PUBLICATIONS

International Search Report dated Jun. 10, 2013, issued in PCT Application No. PCT/EP2013/056433, filed Mar. 26, 2013.
(Continued)

*Primary Examiner* — Hassan Kizou
*Assistant Examiner* — Roberta A Shand
(74) *Attorney, Agent, or Firm* — Workman Nydegger

(57) ABSTRACT

An information-signal (e.g., video-stream of certain quality) (SB1.1, SB1.2, SB1.3, . . . ) is split into two or more (Multicast-) sub-data-streams and transmitted via different channels (CH1,CH2). Thereby, on switching over of two information-signals, seamlessly switch over to another information-signal (e.g., from SD to HD quality) is enabled (in particular at the GOP-boundary in case of video).

16 Claims, 15 Drawing Sheets

Figure 1:
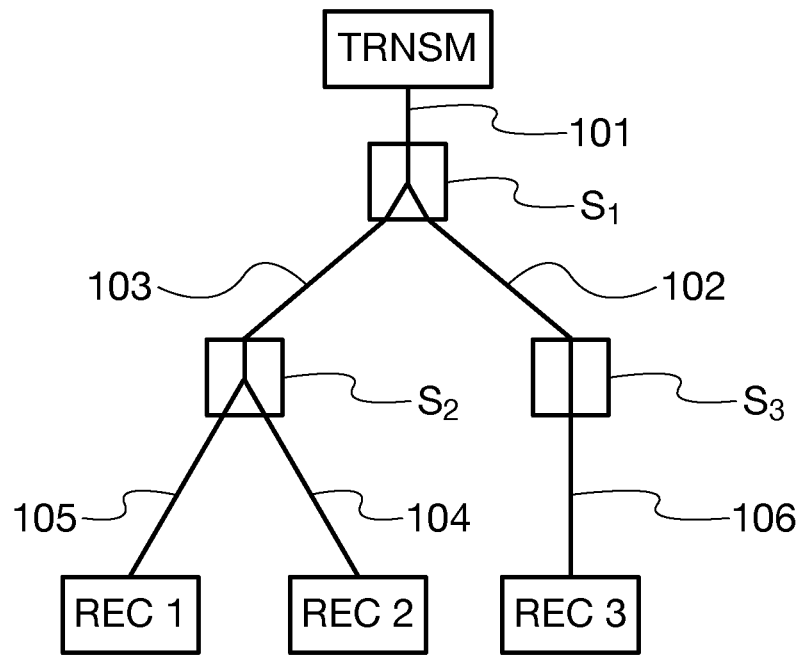

(51) Int. Cl.
    H04N 21/24       (2011.01)
    H04N 21/438      (2011.01)
    H04N 21/6405     (2011.01)
    H04N 21/845      (2011.01)
    H04N 21/6437     (2011.01)
    H04N 21/2343     (2011.01)

(52) U.S. Cl.
    CPC ......... *H04L 65/80* (2013.01); *H04N 21/2402* (2013.01); *H04N 21/4383* (2013.01); *H04N 21/6405* (2013.01); *H04N 21/6437* (2013.01); *H04N 21/8456* (2013.01); *H04N 21/23439* (2013.01)

(58) Field of Classification Search
    CPC . H04L 12/18; H04L 12/1881; H04L 12/1859; H04L 65/4076; H04L 29/06455
    See application file for complete search history.

(56) References Cited

U.S. PATENT DOCUMENTS

| | | | | |
|---|---|---|---|---|
| 9,397,846 B2 * | 7/2016 | Gould | ............... | H04L 12/1881 |
| 2002/0002708 A1 * | 1/2002 | Arye | ............... | H04N 21/23424 |
| | | | | 725/95 |
| 2002/0004369 A1 * | 1/2002 | Kelly | ............... | H01Q 1/1257 |
| | | | | 455/12.1 |
| 2002/0115463 A1 | 8/2002 | Gatherer et al. | | |
| 2002/0184314 A1 | 12/2002 | Riise | | |
| 2003/0078075 A1 | 4/2003 | McNicol | | |
| 2003/0211859 A1 | 11/2003 | Chen et al. | | |
| 2004/0100414 A1 | 5/2004 | Guguen et al. | | |
| 2004/0247022 A1 | 12/2004 | Raghavan et al. | | |
| 2006/0153088 A1 * | 7/2006 | Wong | ............... | H04N 7/17318 |
| | | | | 370/252 |
| 2006/0268873 A1 | 11/2006 | Tonjes et al. | | |
| 2007/0121629 A1 | 5/2007 | Cuijpers et al. | | |
| 2008/0227472 A1 | 9/2008 | Harel et al. | | |
| 2010/0034201 A1 | 2/2010 | Barave et al. | | |
| 2010/0088426 A1 * | 4/2010 | Takemura | .......... | H04N 21/4331 |
| | | | | 709/231 |

FOREIGN PATENT DOCUMENTS

| | | |
|---|---|---|
| EP | 2 312 826 A2 | 4/2011 |
| TW | 200511741 | 6/1993 |
| WO | 2004/051926 A1 | 6/2004 |

OTHER PUBLICATIONS

Written Opinion dated Jun. 10, 2013, issued in PCT Application No. PCT/EP2013/056433, filed Mar. 26, 2013.

English translation of Russian Search Report dated Apr. 21, 2017, issued in Russian Application No. 2014143056, filed Mar. 26, 2013.

* cited by examiner

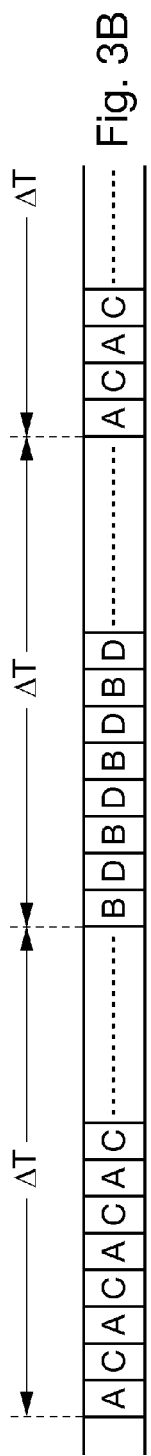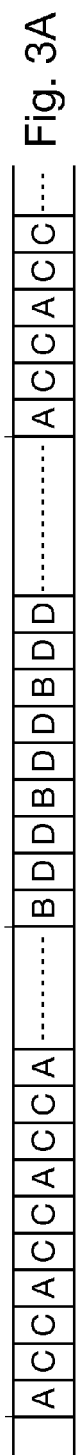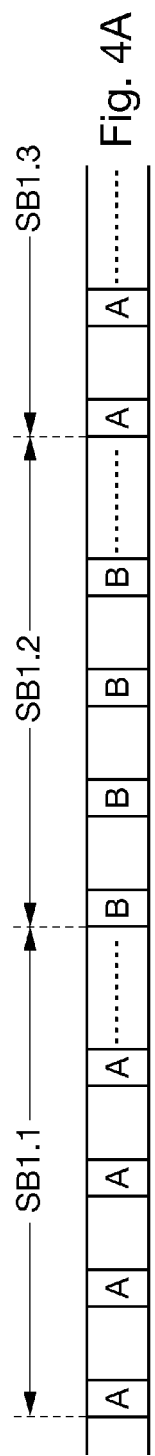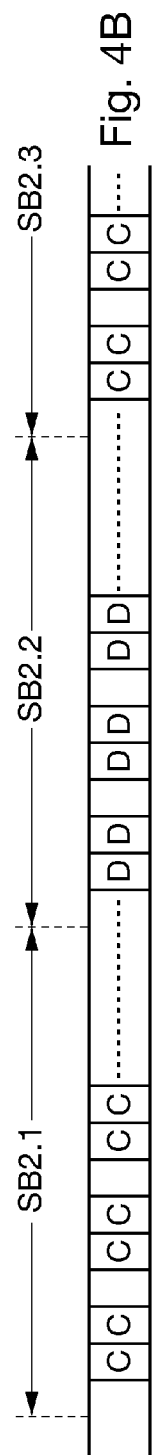

| | A | B | C | D |
|---|---|---|---|---|
| S₁ | S₃ | S₃ | S₂ | S₂ |

| | A | B | C | D |
|---|---|---|---|---|
| S₂ | — | — | REC1 REC2 | REC1 REC2 |

| | A | B | C | D |
|---|---|---|---|---|
| S₃ | REC3 | REC3 | — | — |

Fig. 6

| | A | B | C | D |
|---|---|---|---|---|
| S3 | REC3 | — | — | REC3 |

| | A | B | C | D |
|---|---|---|---|---|
| S1 | S3 | — | S2 | S2, S3 |

Fig. 7

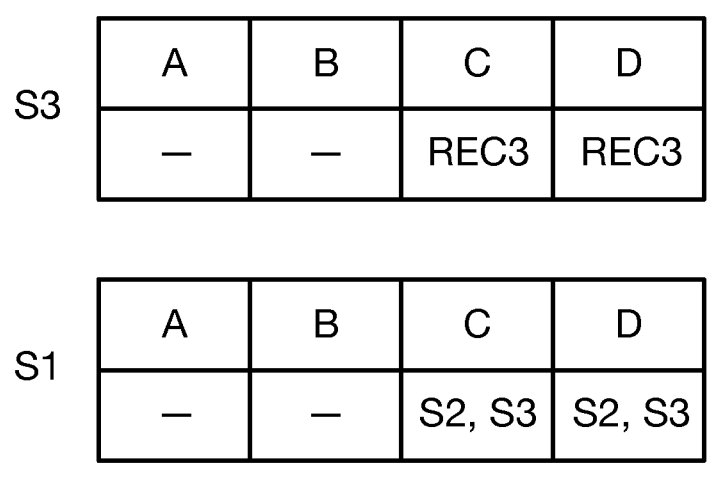

| | A | B | C | D |
|---|---|---|---|---|
| S3 | — | — | REC3 | REC3 |

| | A | B | C | D |
|---|---|---|---|---|
| S1 | — | — | S2, S3 | S2, S3 |

Fig. 8

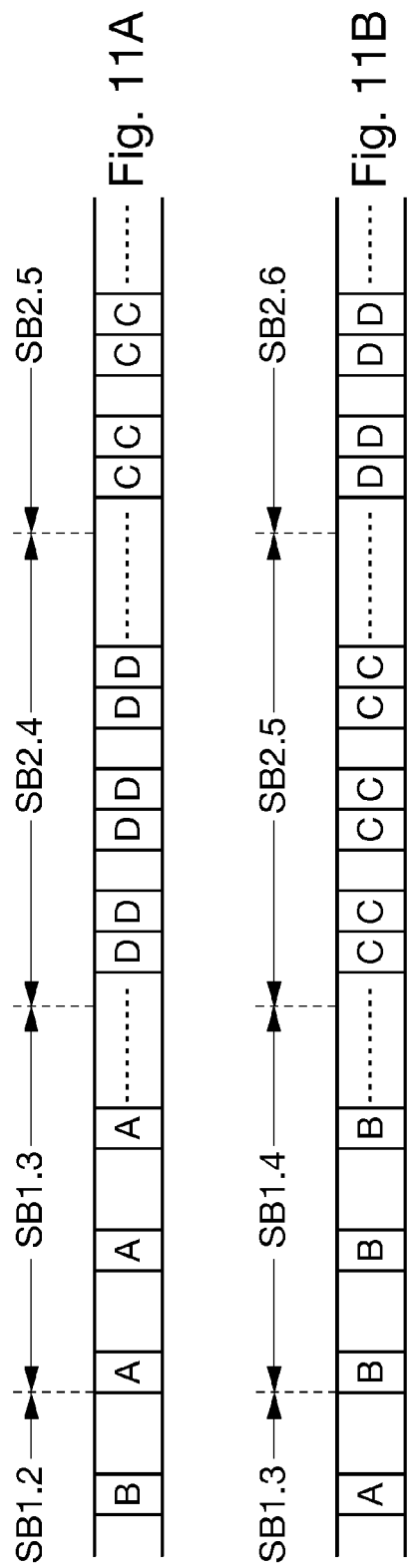

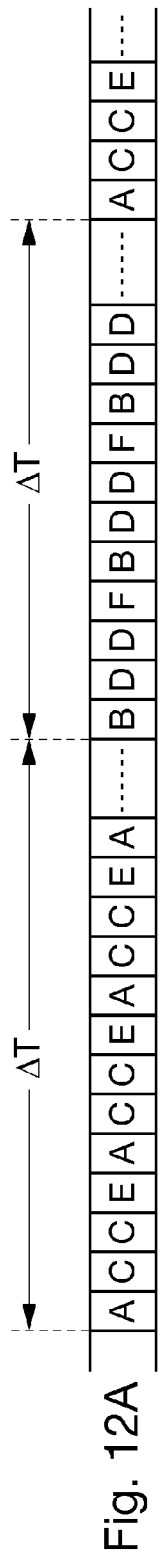
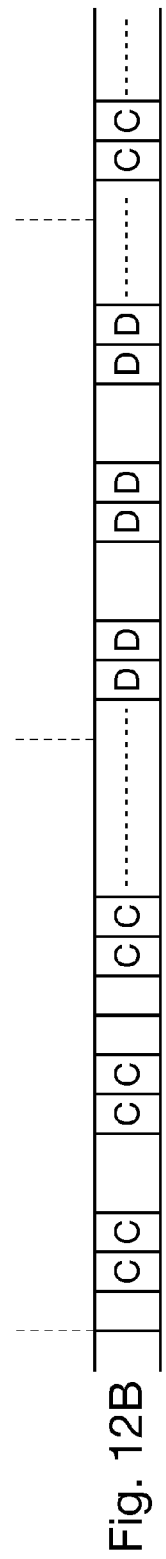
Fig. 12A
Fig. 12B
Fig. 12
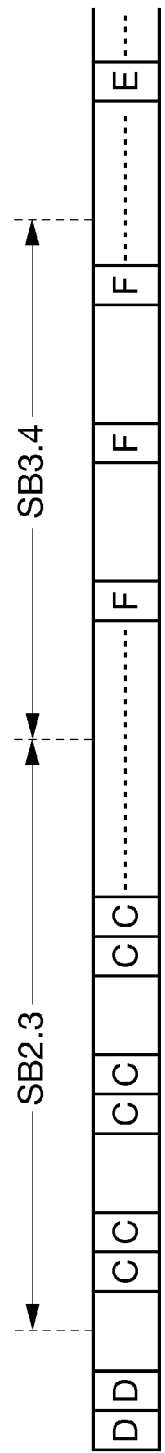
Fig. 17

| S1 | A | B | C | D | E | F |
|---|---|---|---|---|---|---|
|  | $S_3$ | $S_3$ | $S_2$ | $S_2$ | — | — |

| S2 | A | B | C | D | E | F |
|---|---|---|---|---|---|---|
|  | — | — | REC1 REC2 | REC1 REC2 | — | — |

Fig. 13

| S2 | A | B | C | D | E | F |
|---|---|---|---|---|---|---|
|  | — | — | REC1 REC2 | REC1 | — | REC2 |

| S1 | A | B | C | D | E | F |
|---|---|---|---|---|---|---|
|  | $S_3$ | $S_3$ | $S_2$ | $S_2$ | — | $S_2$ |

Fig. 15

| | A | B | C | D | E | F |
|---|---|---|---|---|---|---|
| S3 | — | — | REC1 | REC1 | REC2 | REC2 |

| | A | B | C | D | E | F |
|---|---|---|---|---|---|---|
| S1 | S3 | S3 | S2 | S2 | S2 | S2 |

METHOD FOR TRANSMITTING AND RECEIVING OF AN INFORMATION-SIGNAL VIA A NETWORK, TRANSMITTER AND RECEIVER FOR APPLICATION OF METHOD AND SPLITTER UNIT FOR APPLICATION WITHIN THE NETWORK

DESCRIPTION INTRODUCTION

The invention relates to a method for transmitting and receiving of an information-signal which is provided via a network from a transmitter towards a receiver. The invention also relates to a transmitter and receiver which may be used within the method, and a splitter unit within the network. The transmission of the information-signal may be provided via an IP-Multicast-Network. The invention is not limited thereto.

On switching-over, in the receiver, from reception of a first information-signal to the reception of a second information-signal in particular cases distortions may occur. On switching-over of two information-signals (e.g., having same content of different quality) in particular in case of multicast shows the problem that the reception of the last data of the first information-signal and the reception of the first data of the second information-signal may not be controlled with respect to timing in a sufficient precise manner. In order to guarantee substantial seamless switching-over it would be necessary to receive both information-signals in parallel during a certain period, whereby the available band-width of the connection may potentially be exceeded and thereby data loss may be encountered.

Therefore the invention has the object to provide an improved method. Hence, the method according to the invention is characterized according to claims 1 and 2.

Further advantages of the methods according to the invention are subject of dependent claims 3 to 11. Transmitter and receiver according to the invention, for use of the methods, are defined in claims 12 to 15 respectively 16 to 22. The splitter unit in the network is defined according to claims 24 and 25.

An information-signal (e.g., video-stream of a certain quality) is split into two or more (Multicast-) sub-data-streams, which are used in an alternating manner. And the switching-over-point of the two information-signals is selected such that at this point a switching-over may performed to different quality/variant (e.g., from SD to HD quality) in a seamless manner (in particular at the GOP-boundary in case of video).

By the splitting for any defined period (e.g., GOP-length) on the one sub-data-stream data are send (active) while for the other (for n=2) respectively the others (for n≥2) no data are send (inactive). Thereby a time frame is created within which inactive sub-data-streams may be switched-on respectively switched-off, what is exactly having an impact when the active sub-data-stream is switched. Thereby switching between qualities, which are each transmitted on a data-stream-pair, may be performed as follows, whereby it is assumed that n=2: In the first period, in which the switching-over is initiated the respective inactive sub-data-streams are switched-over (in the first pair switched-off in the second pair switched-on). In the next period (where active and inactive sub-data-streams are exchanged) the remaining two sub-data-streams, which are now inactive, are switched over (again switched-off in the first pair and in the second pair switched-on).

A switching-over to another channels/qualities may happen automatically or manually on basis of different trigger, based on measured or as boundary conditions predetermined values.

These may be external controllers such as management systems as well as manual user intervention as well as a reaction in respect of slitter unit internal parameter. The various switching-over-triggers may have commercial reasons such as for example billing as well as administrative reasons such as QoS (Quality of service) and SLA (Service level agreement).

SHORT DESCRIPTION OF THE FIGURES

Figure 2:
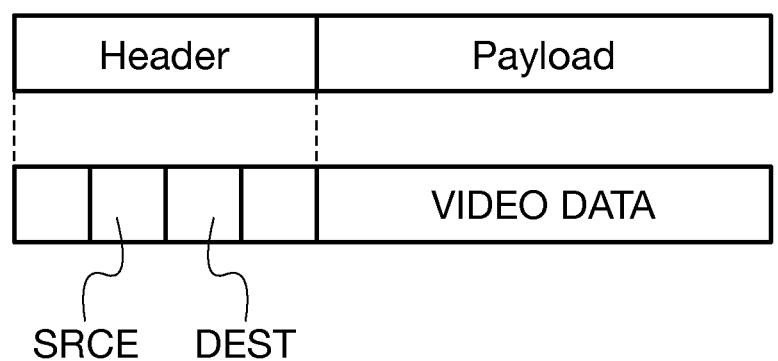
Figure 5:
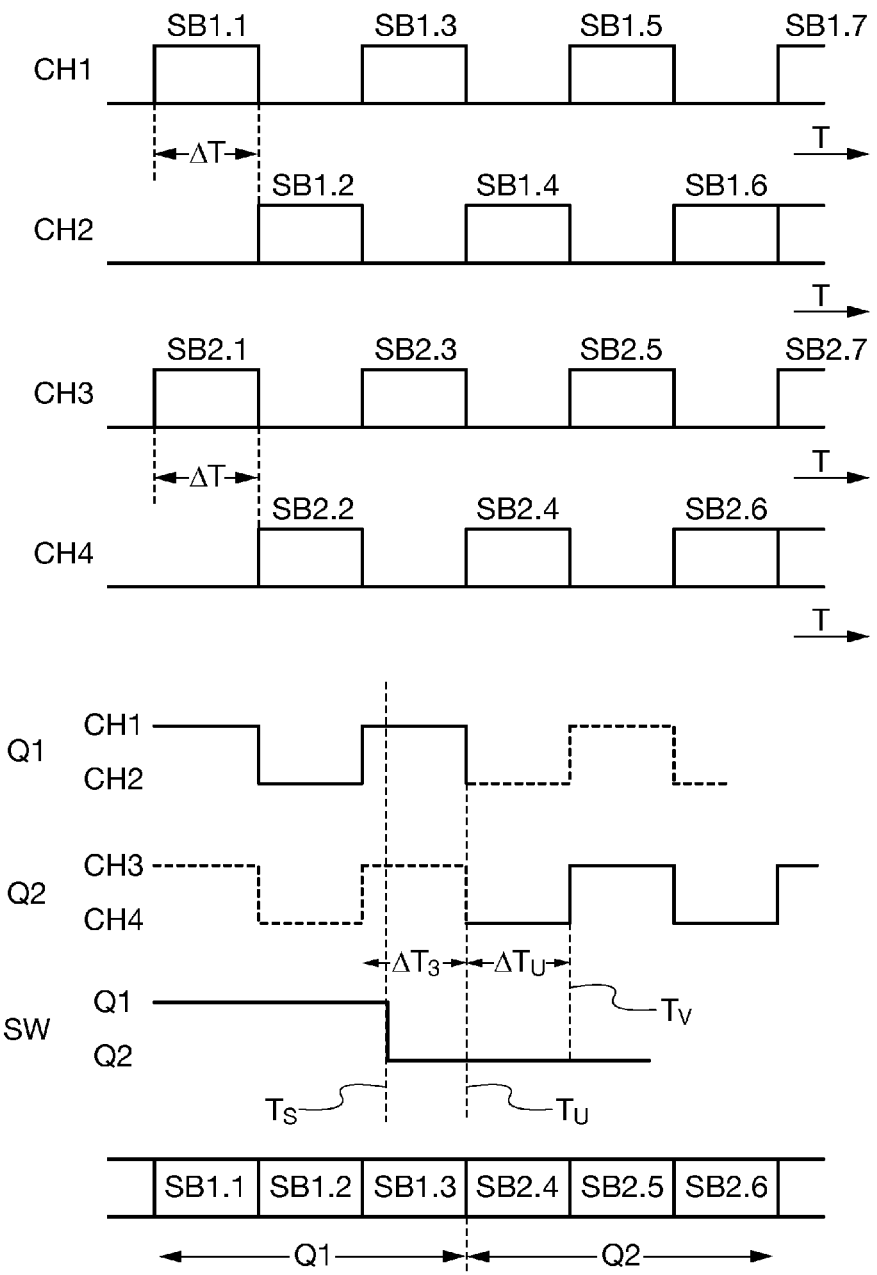
Figures 9, 10:
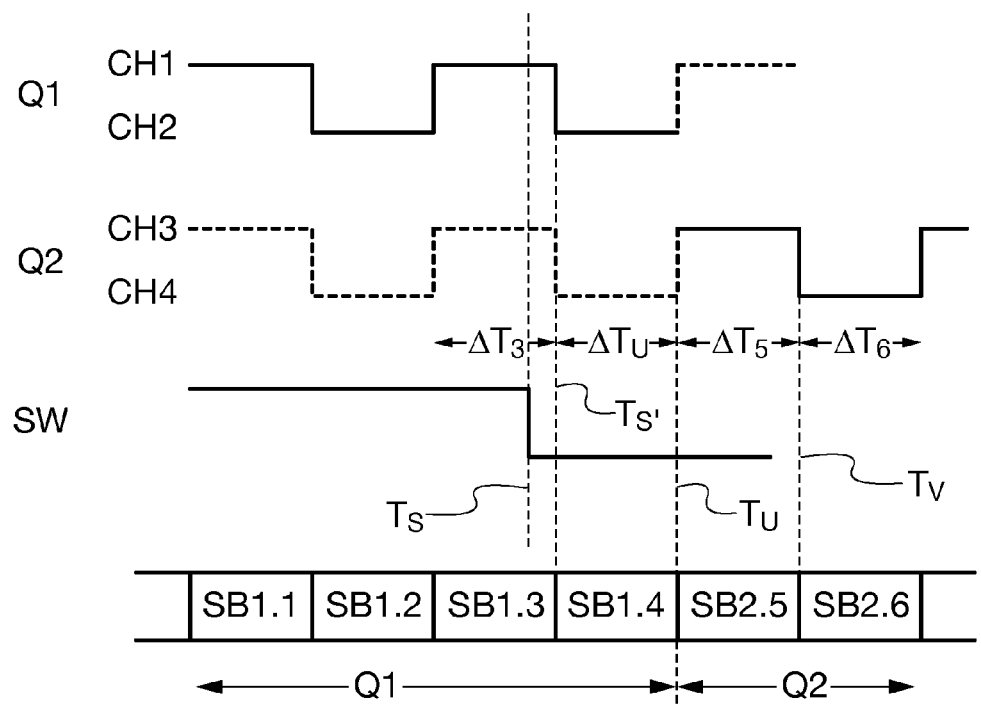
Figures 14, 16:
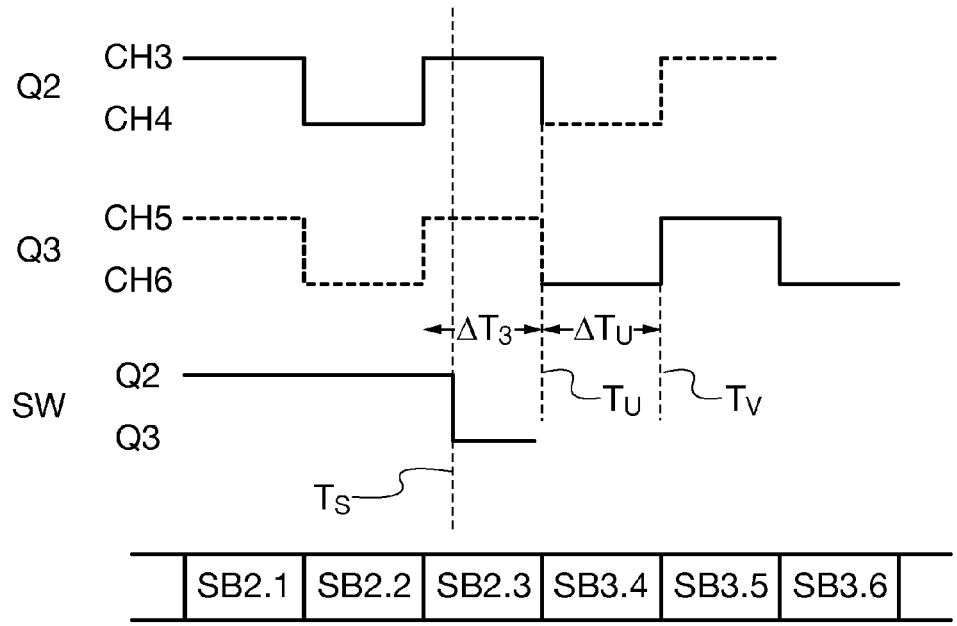
Figure 18:
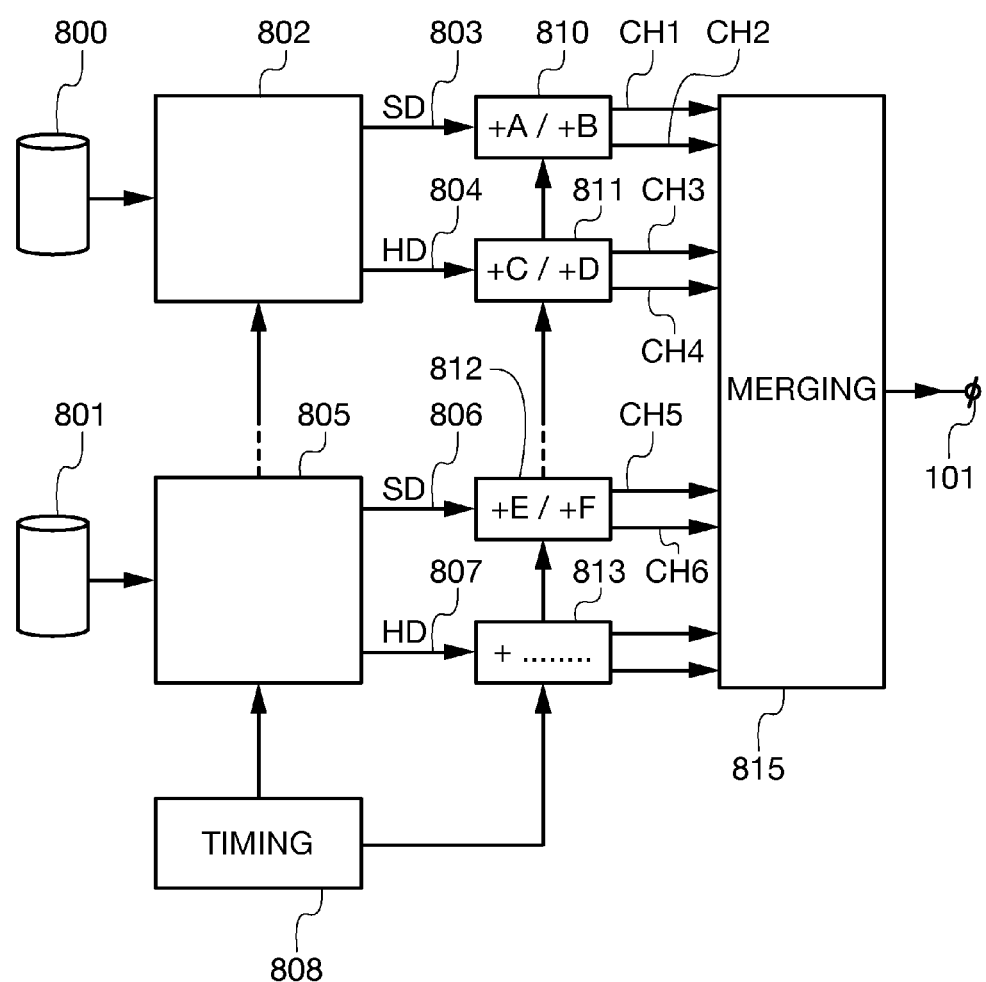
Figure 19:
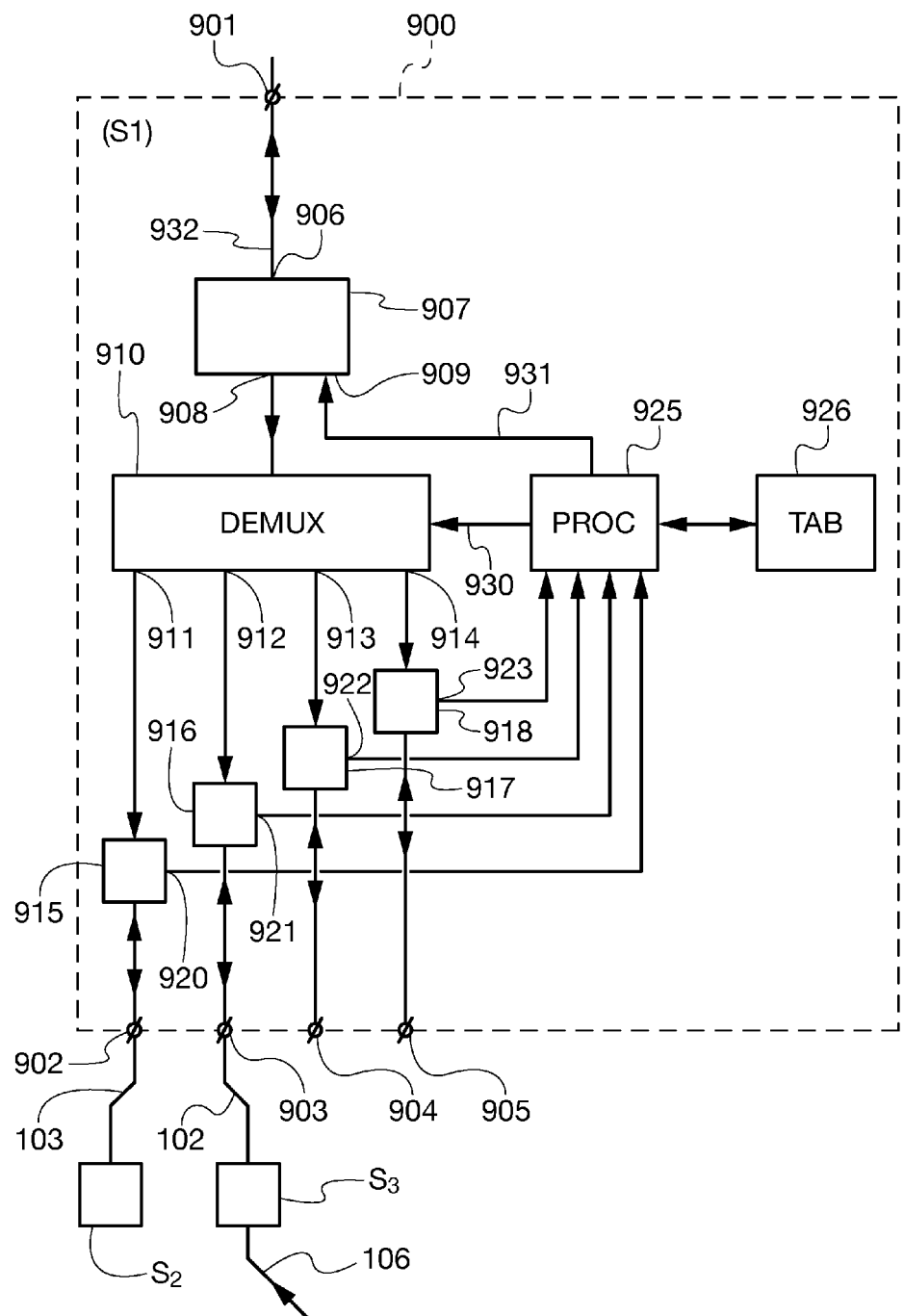
Figure 20:
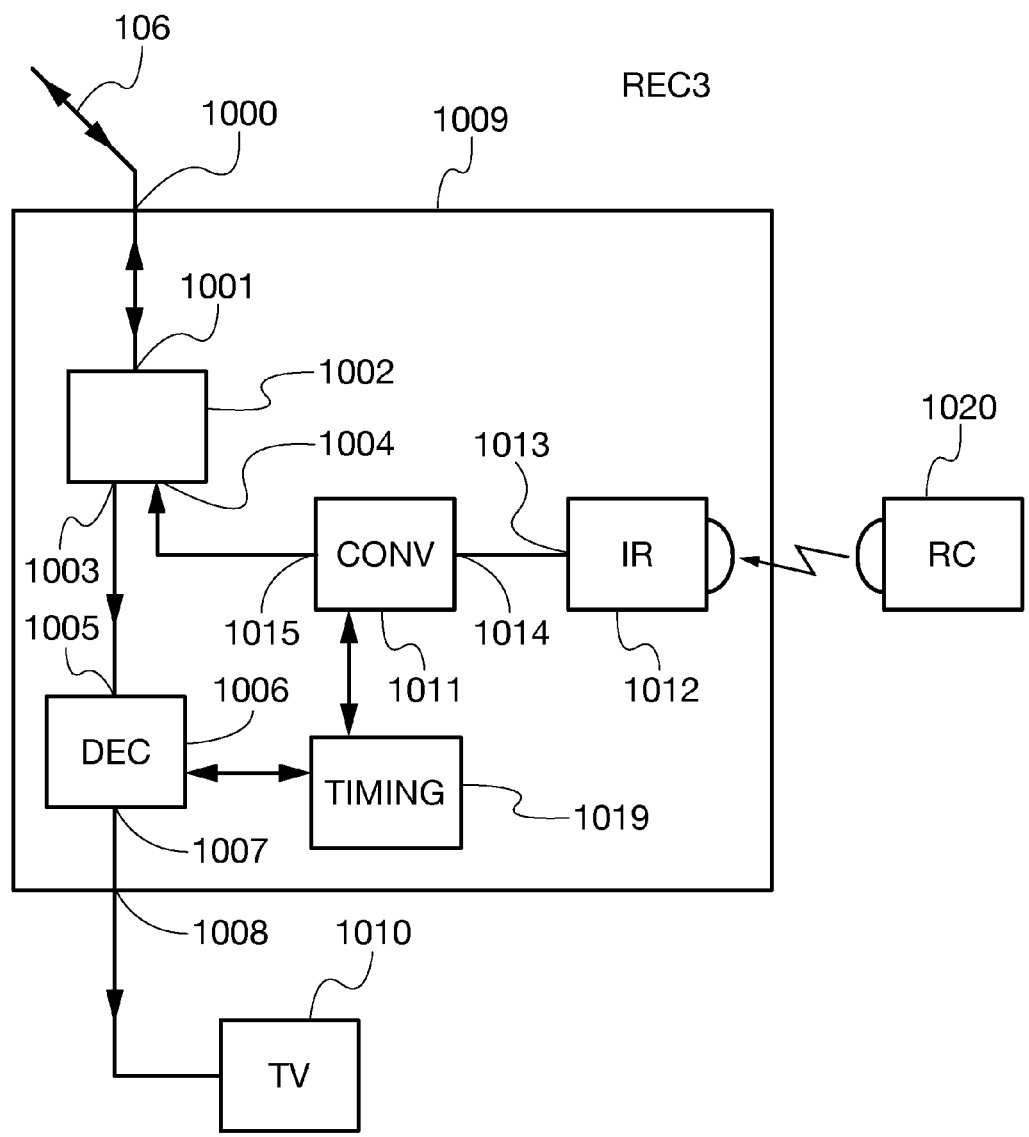
Figure 21:
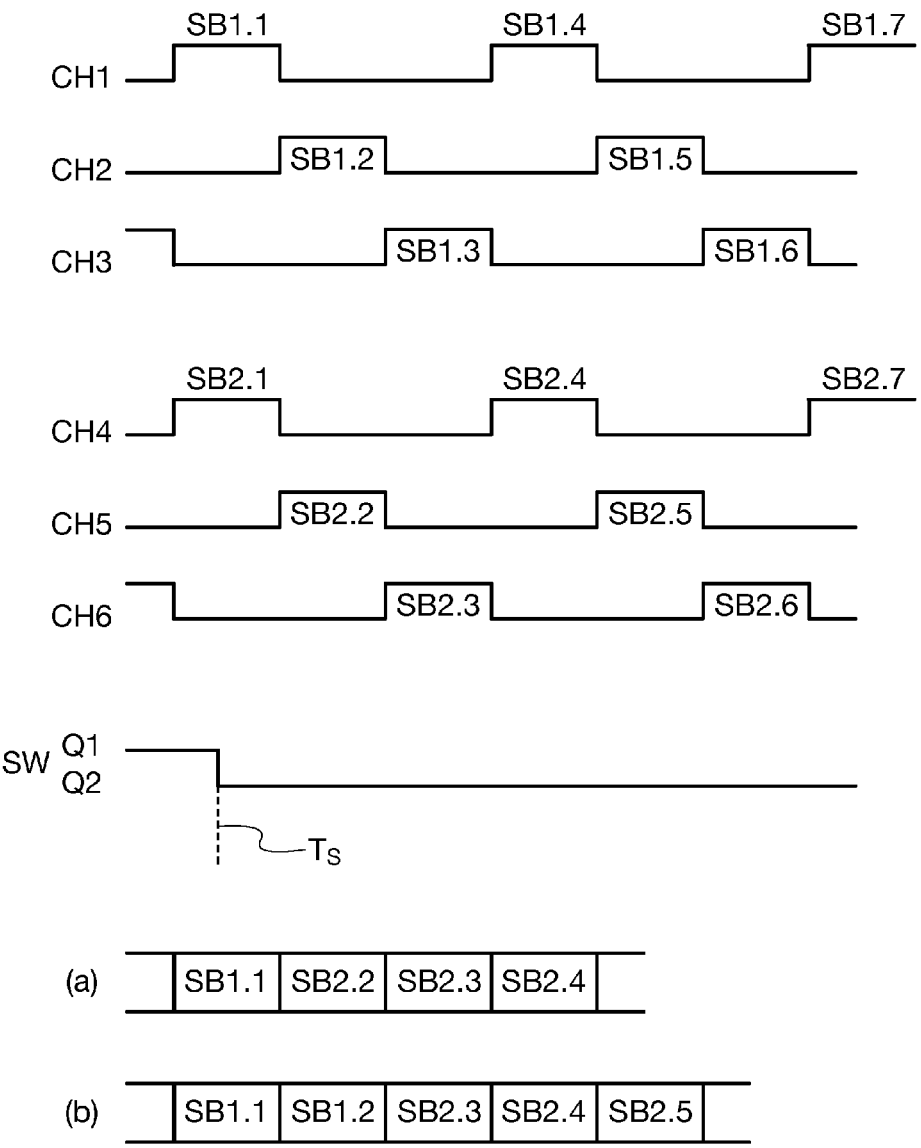
Figure 22:
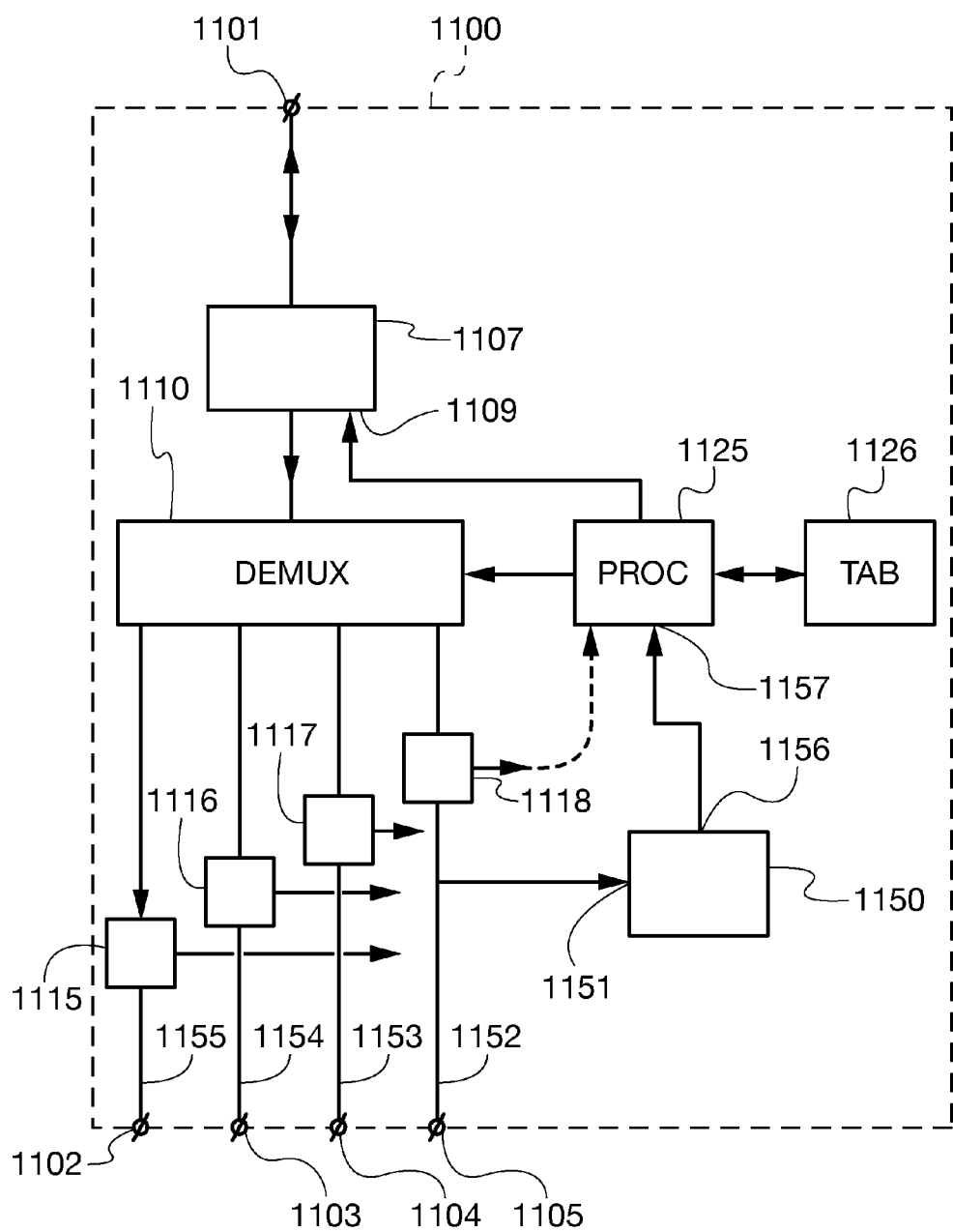

The invention will be detailed with respect to some embodiments with the figure description. There, FIG. 1 shows a transmission network according to the invention in form of a multicast network, FIG. 2 shows schematically a signal-block in form of an IP-packet, FIGS. 3 and 4 show the transmission of two data-streams via the transmission network, FIG. 5 shows the switching-over of the two data-streams, as performed according to the invention, FIGS. 6, 7 and 8 show the modification of the contents of the loop-through-tables in the splitter unit, for the switching-over as described with reference to FIG. 5, FIG. 9 shows a switching-over between the same two data-streams, but at a different point in time, FIGS. 10 and 13 show the modification of the contents of the loop-through-tables in the splitter unit, for the switching-over as described with reference to FIG. 9, FIGS. 11 and 12 show data-streams as occurring when switching-over according to FIG. 9, FIG. 14 shows another example of a switching-over, FIGS. 15 and 16 show the modification of the contents of the loop-through-tables in the splitter unit, for the switching-over as described with reference to FIG. 4, FIG. 17 show the switching-over as described with reference to FIG. 14, on an IP packet-layer, FIG. 18 shows an embodiment of a transmitter in the network, FIG. 19 shows an embodiment of a splitter unit in the network, FIG. 20 shows an embodiment of a receiver according to the invention, FIG. 21 shows an embodiment of a switching-over whereby the information-signals are distributed over three sub-data-streams, and FIG. 22 shows another embodiment of a splitter unit in the network.

FIGURE DESCRIPTION

Within telecommunication Multicast denotes an information transmission from a point to a group (also referred as multipoint connection). The advantage of Multicast consists of allowing for transmitting messages to a plurality of subscribers or a closed group of subscribers at the same time without having the transmitter to multiply the band-width by the number of receivers. For multicast, the transmitter only needs the same band-width as any single receiver. In case of packet-oriented data-transmission, multiplication of the packets is provided by any splitter unit (Switch, Router) within the route.

The difference to broadcast consists of the fact that within Broadcast content is delivered, which may be viewed by any appropriate reception-device, while within Multicast it is necessary to first register with the supplier of the content.

One of the most important fields of application of Multicast is IP-Multicast, which provides for efficient transmitting of packets within IP-networks to a plurality of receivers at the same time. This is provided by means of a special Multicast-address. IPv4-Multicast-addresses are addresses within the range of 224.0.0.0-239.255.255.255. Via these addresses always a group of receivers is addressed.

Multicast is often named in context of audio- and video-transmissions, in particular IPTV. These are using protocols like RTP. It may also be used for clustering and for routing according to the Routing information Protocol (RIP) Version 2.

Since Multicast-packets may not be processed by the majority of routers in the Internet, multicast-enabled sub-networks are connected via tunnels with the Multicast Backbone (MBone).

FIG. 1 shows a transmission network according to the invention in the form of a Multicast network. A transmitter TRNSM is coupled via the Multicast network to receivers REC1, REC2, REC 3 for transmitting one or more information-signals (e.g. video-signals respectively television programs). Splitter unit S1, S2 and S3 are provided for transmitting the information-signals, consisting of a sequence of subsequent signal-blocks (IP-packets), from the transmitter to the receivers.

FIG. 2 shows schematically an IP-packet, which is storing the information and which is transmitted via the network. The IP-packet consists of a Header portion (indicated by Header) and a Payload portion (indicated by Payload). In the Header portion the Source Address (SCRE) is located, which is defining the transmitter (in case of an Internet-connection therefore the IP Address of the transmitter and a receiver Address (DEST), which defines the Multicast group. Within the Payload portion the video information is located.

Receiver REC1 and REC 2 are receiving, e.g., a first information-signal (video-signal) from the transmitter TRNSM via the splitter unit S1 and S2. This is achieved in that the receiver REC1 and R2 join a first Multicast-Group, so that the network may forward IP-packets having this group as DEST towards REC1 and REC2. The receiver REC 3 receives a second information-signal (video-signal) from the transmitter TRNSM via the splitter unit S1 and S3. This is achieved in that the REC3 joins the second Multicast-Group.

The first information-signal may be, e.g., a SD (standard definition) video-signal. The second information-signal may be a totally different video (television) program with respect to the first information-signal or a same video-program in, e.g., HD (high definition) quality.

According to the invention the transmitter splits the subsequent signal-blocks of the first information-signal into two sub-data-streams, i.e., a first sub-data-stream of the even signal-blocks and a second sub-data-stream of the odd signal-blocks of the first information-signal.

Likewise the transmitter splits the subsequent signal-blocks of the second information-signal into two sub-data-streams, i.e., a third sub-data-stream of the even signal-blocks and a fourth sub-data-stream of the odd signal-blocks of the second information-signal.

Each signal-block may comprise a GOP (Group of Pictures) of a video-signal.

The signal-blocks of the first and second sub-data-streams of the first information-signal differ from one another in the Destination addresses of the IP-packets, within which the video-information of a signal-block of the first respectively second sub-data-stream is comprised. This is indicated later in FIG. 3, namely schematically by DEST=A respectively DEST=B. The signal-blocks of the third and fourth sub-data-streams of the second information-signal differ from one another as well in the destination addresses of the IP-packets, within which the video-information of a signal-block of the third respectively fourth sub-data-stream is comprised. This is also indicated later in FIG. 3, namely (again schematically) by DEST=C respectively DEST=D.

In general it may be noted that the amount of the IP-packets, within which the video-information of a signal-block is comprised, may be, e.g., equal to 512 or 1024.

FIG. 3 shows the transmission of two data-streams via the transmission network. It is assumed that the receiver REC1 and REC2 have requested reception of the first information-signal (video-signal/television program) by means of an IGMP Request, which is transmitted from the receivers REC1 and REC2 via the transmission network to the transmitter TRNSM. The receiver REC3 has likewise requested reception of the second information-signal (video-signal/television program) by means of an IGMP-Request, which is transmitted from the receiver REC3 via the transmission network to the transmitter TRNSM. The transmitter merges the IP-packets of the first and second information-signals in the manner as described in FIG. 3a and supplies this signal afterwards to the connection 101 in FIG. 1. Within a particular time-interval $\Delta T$ the A IP-packets of a first signal-block of the first information-signal are assembled within time with the C IP-packets of a first signal-block of the second information-signal, e.g., in the following sequence:

ACCACCACCACCACC . . . .

Within the subsequent time-interval $\Delta T$ the B IP-packets of a second signal-block of the first information-signal are assembled within time with the D IP-packets of a second signal-block of the second information-signal, e.g., in the following sequence:

BDDBDDBDDBDDBDD . . . .

Since the first information-signal is a SD video-signal and the second information-signal is a HD video-signal more IP-packets are necessary for transmitting the second information-signal than for the first information-signal (in the present case: 2× more). The transmission signal at the output of the transmitter is therefore composed of a sequence of signal-blocks of the first and the second information-signals.

As a further explanation the transmission signal is shown in FIG. 3b for the case that two SD video-signals shall be transmitted. In this case within the first time-interval $\Delta T$ the A and C IP-packets are transmitted in an alternating manner and in the following time-interval B and D IP-packets are transmitted in an alternating manner.

In the splitter unit S1, see FIG. 1, the transmission signal is distributed according to FIG. 3a on the connections 102 and 103.

FIG. 4 shows in FIG. 4a the transmission signal on connection 103. It consists only of the signal-blocks of the first video-signal, SB1.1, SB1.2, SB1.3 . . . since the receiver REC1 and REC 2 both shall receive the first information-signal. In FIG. 4b the transmission signal on the connection 102 is shown. It consists only of the signal-blocks of the second information-signal, SB2.1, SB2.2, SB2.3, . . . since the receiver REC3 shall only receive the second information-signal.

FIG. 5 shows the switching-over between these two data-streams, as it is performed according to the invention.

With respect to time the signal-blocks having A IP-packets SB1.1, SB1.3, SB1.5, . . . (in FIG. 5 indicated as first sub-data-stream CH1) and the signal-blocks having B IP-packets SB1.2, SB1.4, SB1.6, . . . (in FIG. 5 indicated as second sub-data-stream CH2) having a time-length of ΔT are transmitted from the transmitter TRNSM to the receiver REC3. In addition it is denoted how with respect to time the signal-blocks having C IP-packets SB2.1, SB2.3, SB2.5, (in FIG. 5 indicated as third sub-data-stream CH3) and the signal-blocks of the D IP-packets SB2.2, SB2.4, SB2.6, . . . (in FIG. 5 indicated as fourth sub-data-stream CH4) having the same time-length ΔT are transmitted from the transmitter TRNSM to the receivers REC1 and REC2 in an alternating manner.

The four sub-data-streams CH1 to CH4 may be recognized as virtual channels, via which the two information-signals/video-signals via the network may be transmitted.

In the receiver REC3 it is now switched-over from the reception of the first information-signal to the reception of the second information-signal.

By signal S a switching-over-command-signal is indicated in FIG. 5. Before the moment in time TS the signal SW is a "logic high". That means, that the receiver REC3 is operating in a mode (in FIG. 5 indicated by Q1) within which the first sub-data-stream-pair CH1, CH2 is received and processed. Thereby the data-blocks SB1.1, SB1.2, . . . from the data-stream-pair CH1, CH2 are received and processed in an alternating manner.

At point in time TS a switching-over-command issues by switching the switching-over-signal SW from "logic high" to "logic low". In the time-interval ΔT3 in which the switching-over-command is generated and the signal-block SB1.3 is received, the receiver remains in a reception-mode, whereby the signal-block SB1.3 is received entirely and processed. Directly after TS the receiver initiates the reception of the inactive data-stream of the second sub-data-stream-pairs CH3, CH4 and terminates the reception of the inactive data-stream of the first sub-data-stream-pairs. This switching-over will now be described in more detail.

A user of the receiver REC3 issues a switching-over-command by means of the remote control of a Set-top box, in the sense of 'switch over from reception of the first video-signal (television program) to the reception of the second video-signal (television program)'. It is also possible that within the receiver (or one of the splitter units) and if applicable automatically (see also later) a switching-over-command is generated for switching-over to an information-signal having different quality (from SD to HD, or vice versa). The later switching-over will be described in the following.

The transmission-system according to the invention is provided with novel intelligence. This intelligence consists on the transmitter's side in that the transmitter TRNSM is enabled to distribute the video-signal each to two virtual channels and to transmit (see also later). Part of the intelligence is also comprised within the splitter units S1, S2 and S3. In addition also the receivers may comprise novel intelligence for enabling the transmission according to the invention.

The Multicast signal distribution in the splitter units S1, S2 and S3 consist of comprising so called loop-through-tables, which specifies which sub-data-streams are forwarded to the thereto connected splitter unit. These loop-through-tables are shown in FIG. 6 for the splitter unit S1, S2 and S3 and showing the content of these tables at a point in time before time $T_s$ in FIG. 5. In the table for S1 it is denoted that the splitter unit forwards the first and second sub-data-streams (indicated by A and B in the table) to the splitter unit S3 and the third and fourth data-streams (indicated by C and D in the table) are forwarded to the splitter unit S2. In the table for S2 it is denoted that the splitter unit S2 the first and second sub-data-streams (indicated by A and B in the table) is not forwarding to a splitter unit and the third and fourth data-streams (indicated by C and D in the table) are forwarded to the receivers REC1 and REC2. In the table for S3 it is denoted that the splitter unit S3 forwards the first and second sub-data-streams (indicated by A and B in the table) to the receiver REC3 and the third and fourth data-streams (indicated by C and D in the table) are not forwarded to a receiver.

After the reception of the switching-over-command SW at a point in time $T_s$ in the splitter unit S3 the loop-through-table in S3 is changed in that REC3 in the column B of the table is discarded and REC3 is inserted in column D of the table. Furthermore the splitter unit generates a switching-over-command for splitter unit S1 for that it is denoted that it will from now on receive the fourth sub-data-stream. Thereafter the splitter unit S1 changes its table in that S3 in the column below B is discarded and S3 in the column below D is inserted. This is indicated in FIG. 7. That is that from point in time $T_U$ the data of the fourth sub-data-stream are transmitted from the transmitter TRNSM via the splitter unit S1 and S3 to the receiver REC3, starting with the data-block SB2.4 within time-interval $\Delta T_4$. No further data of the second sub-data-streams are received and the receiver processes the second quality (SD or even HD). In order to continue receiving the second quality starting from the time-interval $\Delta T_5$ the inactive data-stream of the first sub-data-stream is terminated and the inactive data-stream of the third sub-data-stream is received, so that in the subsequent time-interval $\Delta T_5$ the signal-block SB2.5 is received and processed. In this manner, it is switched-over from first information-signal Q1 to the second information-signal Q2 in a seamless manner.

The later will be describer hereafter in detail with respect to FIG. 8.

After ending the reception of the signal-block SB1.3 the splitter unit S3 erases in its loop-through-table REC3 in the column below A and REC3 is inserted in the table in the column below C. Furthermore the splitter unit generates a switching-over-command for splitter unit S1 for that it is denoted that it will from now on receive the third sub-data-stream. Thereafter the splitter unit S1 changes its table in that S3 in the column below A is discarded and S3 is inserted in the column below C. This is indicated in FIG. 8.

That is that from point in time $T_v$ the data from the third sub-data-stream are transmitted from the transmitter TRNSM via the splitter unit S1 and S2 to the receiver REC3, starting from data-block SB2.5. No further data of the first sub-data-stream are received. In FIG. 11A this switching-over is indicated on IP-packet level.

FIG. 9 shows another switching-over from reception of the first data-stream-pairs to the reception of the second data-stream-pairs. By the signal SW in FIG. 9 again a switching-over-command-signal is indicated. The switching-over-command (the transition from "logic high" to "logic low") is now taking place at a later moment in time TS within the time-intervals ΔT3. The remaining time in the time-interval ΔT3 is too short for the receiver to switch-over the inactive data-streams. Therefore, the switching-over-command is delayed until TS', which is coinciding with the start of ΔT4. Thereafter it is proceeded like in FIG. 9. Again it is switched-over from the first data-stream Q1 to the second data-stream Q2 in a seamless manner. This is further detailed with respect to FIG. 10.

After the reception of the switching-over-command SW at the point in time $T_s$, in the splitter unit S3 the loop-through-table in S3 changed in that REC3 in the column A of the table is discarded and REC3 is inserted in column C of the table. Furthermore the splitter unit generates a switching-over-command for splitter unit S1 for that it is denoted that from now on will receive the third sub-data-stream. Thereafter the splitter unit S1 changes its table in that S3 in the column below A is discarded and S3 is inserted in the column below C. This is indicated in FIG. 10. That is that in the beginning the signal-block SB1.4 is received entirely and from the point in time $T_U$ the data of the third sub-data-streams are transmitted from the transmitter TRNSM via the splitter unit S1 and S3 to the receiver REC3, starting with the data-block SB2.5 in the time-interval $\Delta T_5$. No further data of the first sub-data-streams are received and the receiver processes the second quality (SD or even HD). In order to continue receiving the second quality starting from the time-interval $\Delta T_6$ the inactive data-stream of the second sub-data-stream is terminated and reception of the inactive data-stream of the fourth sub-data-stream is started, so that in the subsequent time-interval $\Delta T_6$ the signal-block SB2.6 is received and processed. In this manner it is switched-over from the first data-stream Q1 to the second data stream Q2 in a seamless manner.

The later will be described hereafter in detail.

After end of reception of the signal-block SB1.4 the splitter unit S3 erases in its loop-through-table according to FIG. 10 REC3 in the column below A, and inserts REC3 in the table in the column below C. Furthermore the splitter unit S3 generates a switching-over-command for splitter unit S1 for that it is denoted that it will from now on receive the third sub-data-stream. Thereafter the splitter unit S1 changes its table according to FIG. 10 in that S3 in the column below B is discarded and S3 is inserted in the column below D. Thus, in the end the content of the table for the splitter unit S1 and S3 as indicated in FIG. 8 is achieved.

That is that from the point in time $T_v$ the data of the fourth sub-data-stream are transmitted from the transmitter TRNSM via the splitter unit S1 and S2 to the receiver REC3, starting with the data-block SB2.6. No further data of the second sub-data-streams are received. In FIG. 11B the switching-over is still indicated on an IP-packet level.

In the following it will be described how the receiver REC2 switches over to a third information-signal (television program), which is also provided by the transmitter TRNSM. The transmitter distributes the subsequent signal-blocks of the third information-signal to two sub-data-streams, i.e., a fifth sub-data-stream of the even signal-blocks and a sixth sub-data-stream of the odd signal-blocks of the third information-signal.

Each signal-block may in turn comprise, e.g., a GOP (Group of Pictures) of the video-signal.

The signal-blocks of the fifth and sixth sub-data-stream of the third information-signal differ from one another in that the destination-addresses of the IP-packets, in which the video-information of a signal-block of the fifth respectively sixth sub-data-stream is comprised. This is shown later in FIG. 12A schematically by DEST=E respectively DEST=F.

The transmitter assembles the IP-packets of the first, second and third information-signals in the manner described in FIG. 12A and then supplies this signal to the connection 101 in FIG. 1. During a certain time-interval $\Delta T$ the A, C and E IP-packets of a first signal-block of the first respectively second respectively third information-signal are assembled with respect to the time, e.g., in the following sequence:

ACCEACCEACCEACCEACCE . . . .

During the subsequent time-interval $\Delta T$ the B, D and F IP-packets of a second signal-block of the first respectively second respectively third information-signal are assembled, e.g., in the following sequence:

BDDFBDDFBDDFBDDFBDDF . . . .

Since the third information-signal is also a SD video-signal, this information-signal necessitates as many IP-packets as the first information-signal (also a SD video-signal).

In the splitter unit S1, see FIG. 1, the transmission-signal is distributed according to FIG. 12a to the connections 102 and 103.

FIG. 12B shows the transmission-signal of the connection 103. It consists only of the signal-blocks of the second information-signal, SB2.1, SB2.2, SB2.3 . . . since the receiver REC1 and REC 2 both are receiving the second information-signal. Therefore, the transmission-signal of the connections 103, 104 and 105 (see FIG. 1) are the same. The loop-through-table in the splitter units S1 and S2 before switching-over look like indicated in FIG. 13. Since no request for the third information-signal is received yet, the columns E and F in the loop-through-table are empty. The content of the columns A, B, C and D is as indicated in the Tables in FIG. 6.

FIG. 14 shows the switching-over of the receiver REC2 from the second to the third information-signal, as it is performed according to the invention.

With respect to time the signal-blocks having C IP-packets SB2.1, SB2.3, SB2.5, . . . (in FIG. 14 displayed as second sub-data-stream CH3) and the signal-blocks having D IP-packets SB2.2, SB2.4, SB2.6, . . . (in FIG. 14 displayed as third sub-data-stream CH4) are transmitted in an alternating manner having a time-length of $\Delta T$ from the transmitter TRNSM to the receiver REC2. Likewise it is indicated how the signal-blocks having E IP-packets SB3.1, SB3.3, SB3.5, (in FIG. 14 displayed as fifth sub-data-stream CH5) and the signal-blocks of the F IP-packets SB3.2, SB3.4, SB3.6, . . . (in FIG. 14 displayed as sixth sub-data-stream CH6) having same time-length $\Delta T$ are generated in an alternating manner by the transmitter TRNSM, however are not transmitted to a receiver.

The sub-data-streams CH3 to CH6 may in turn be recognized as virtual channels, via which the two information-signals/video-signals/television programs/Multimedia-programs are transmitted via the network.

In the receiver REC2 it is now switched-over from the reception of the second information-signal to the reception of the third information-signal.

By means of the signal SW a switching-over-command-signal is indicated in FIG. 14. Before the moment in time TS the SW is "logic high" (equals Q2). That is, that the receiver REC2 is operating in a mode (in FIG. 14 indicated by Q2), in which the second sub-data-stream-pair CH3, CH4 is received and processed. Thereby, the data-blocks SB2.1, SB2.2, . . . of the data-stream-pair CH3, CH4 are received and processed in an alternating manner.

At the point in time TS issues a switching-over-command which switches over the switching-over-signal SW from "logic high" to "logic low". In the time-interval $\Delta T3$ in which the switching-over-command is generated and the signal-block SB2.3 is received, the receiver remains in the reception-mode, whereby the signal-block SB2.3 is received and processed entirely. Immediately after TS the receiver initiates the reception of the inactive data-streams of the third sub-data-stream-pair CH5, CH6 and terminates the reception of the inactive data-streams of the second sub-data-stream-pair. This switching-over is now described in detail.

A user of the receiver REC2 issues a switching-over-command, e.g., by means of the remote control of a set-top-box, in the sense of "switch over from reception of the second information-signal (television program) to the reception of the third information-signal (television program)". It is also noted here, that it is also possible that within the receiver (or one of the splitter unit) and if applicable automatically (see also later) a switching-over-command is generated for switching-over to an information-signal having different quality (from SD to HD, or vice versa).

After reception of the switching-over-command SW at point in time $T_s$ in the splitter unit S2 the loop-through-table in S3 changes in so far, that REC2 in the column D of the table is discarded and REC2 is inserted in column F of the table. Furthermore the splitter unit S2 generates a switching-over-command for splitter unit S1 whereby it is signaled, that it will from now on also receive the sixth sub-data-stream. Thereafter the splitter unit S1 changes its table in that S2 is inserted in the column F. This can be seen in FIG. 15. That is, that from the point in time $T_U$ the data of the sixth sub-data-streams are transmitted from the transmitter TRNSM via the splitter unit S1 and S2 to the receiver REC2, starting with the data-block SB3.4 in the time-interval $\Delta T_4$. No further data of the fourth sub-data-streams are received. In order to receive the fifth sub-data-stream beginning with the time-interval $\Delta T_5$ the inactive data-stream of the third sub-data-streams is now terminated and the reception of the fifth sub-data-stream is started, so that in the subsequent time-interval $\Delta T_5$ the signal-block SB3.5 is received and processed. In this manner, it is switched-over from second information-signal Q2 to the third information-signal Q3 in a seamless manner.

The later will be describer hereafter in detail with respect to FIG. 16.

After ending the reception of the signal-block SB2.3 the splitter unit S2 the splitter unit S3 erases in its loop-through-table REC2 in the column D and REC2 is inserted in the table in column E. Furthermore, the splitter unit S2 generates a switching-over-command for splitter unit S1 to signal, that from now on it will also receive the fourth sub-data-stream. Thereafter the splitter unit S1 changes its table such that S2 is inserted in the column E (see FIG. 16).

That is that from point in time $T_v$ the data of the fifth sub-data-stream are transmitted from the transmitter TRNSM via the splitter unit S1 and S2 to the receiver REC2, starting with the data-block SV3.5. No further data of the third sub-data-stream are received. In FIG. 17 this switching-over is indicated also on IP-packet level.

FIG. 18 shows schematically an embodiment of a transmitter TRNSM. Memories 800 and 801 are provided having, e.g., two television programs. In a processing unit 802 two information-signals are derived from the television program stored in the memory 800, i.e., a SD version 803 (the previously described first information-signal) and a HD version 804 (the previously described second information-signal). In a processing unit 805 two information-signals are derived from the television program stored in the memory 801, i.e., a SD version 806 (the previously described third information-signal) and a HD version 807 (a not yet further described fourth information-signal).

A timing-unit 808 is provided, which controls the processing units 802 and 805 such that all four information-signals (video-signals) are divided in signal-blocks (e.g., GOPs) and these are supplied by the processing units 802 and 805 in a time-aligned manner (e.g., "GOP-aligned").

Further mixing units 810 to 813 are provided, which also operate under influence of a timing-signal of the timing unit 808. Mixing units 810 to 813 can also be considered herein as a first unit 810, second unit 811, third unit 812 and fourth unit 814. In mixing unit 810 the signal-blocks (GOPs) of the first information-signal (video-signal) are packaged in IPpackets. In addition, in all IP-packets of the even signal-blocks the value A is stored in the receiver-address field DEST and in all IP-packets of the odd signal-blocks the value B is stored in the receiver-address field DEST. Thereby the first and second sub-data-stream CHI and CH2 are generated, which are provided by the signal-combination-unit 815.

In the mixing unit 811 the signal-blocks (GOPs) of the second information-signal (video-signal) are packaged in IP-packets. In addition, in all IP-packets of the even signal-blocks the value C is stored in the receiver-address field DEST and in all IP-packets of the odd signal-blocks the value D is stored in the receiver-address field DEST. Thereby the third and fourth sub-data-stream CH3 and CH4 are generated, which are likewise provided by the signal-combination-unit 815.

In the mixing unit 812 the signal-blocks (GOPs) of the third information-signal (video-signal) are packaged in IP-packets. In addition, in all IP-packets of the even signal-blocks the value E is stored in the receiver-address field DEST and in all IP-packets of the odd signal-blocks the value F is stored in the receiver-address field DEST. Thereby the fifth and sixth sub-data-stream CH5 and CH5 are generated, which are provided by the signal-combination-unit 815.

In case that still further video-signals shall be transmitted (such as the HD signal 807), further mixing units (such as the unit 813) for distributing the video-signal in two sub-data-streams, which are in turn to be forwarded to the merging-unit 815, are provided.

The merging-unit 815 assembles all these sub-data-streams to a transmission-signal in the manner described in FIG. 12A (an example having only three video-signals), and supplies this transmission-signal in the connection line 101.

FIG. 19 shows an embodiment of a splitter unit 900, e.g., like the splitter unit S1. The splitter unit 900 is provided with an input 901, which is either coupled to the transmitter TRNSM—the splitter unit 900 is the splitter unit S1—or to the output of an upstream located splitter unit (the splitter unit 900 is, e.g., the splitter unit S2 and the upstream located splitter unit is splitter unit S1). The splitter unit 900 is further provided with outputs 902 to 905. In case, that the splitter unit 900 is the splitter unit S1, only two outputs are required (or active). These are the outputs 902 and 903, which are coupled to respective inputs of the splitter unit S2 respectively S3.

The Input 901 of the splitter units 900 is coupled to a terminal 906 of an UP/DOWN signal-combination-unit 907. A second terminal 908, which serves as output terminal, is coupled to an input terminal of a demultiplexing-circuit 910 (DEMUX). In addition the demultiplexing-circuit is provided with outputs 911 to 914, which each are coupled to a respective UP/DOWN signal-providing-units 915 to 918 having the respective outputs 902 to 905.

The outputs 920 to 924 of the respective UP/DOWN signal-providing-units 915 to 918 are coupled to inputs of a processing unit 925. A memory 926 for storing the content of the loop-through-table for this splitter unit is provided, which is coupled to the processing unit 925.

The processing unit 925 controls the demultiplexing unit 910 and the UP/DOWN signal-combination-unit 907 by means of control signals via the lines 930 respectively 931.

The connections 101 to 105 (see FIG. 1) are described and explained so far mainly as down-link connections. However, it has also been described that switching-over-command-signals are transmitted from a receiver to a splitter unit and among upstream-located splitter units. Therefore, the connections 101 to 105 may also be used as up-link connection. In other words, the data transport via the connections 101 to 105 may be bidirectional.

In the down-direction the information-signals are transmitted via so-called down-link ports and in the up-direction the switching-over-commands are, as they have been described, in up-link ports transmitted.

A switching-over-command-signal is transmitted from the splitter unit S3 in FIG. 19 via the up-link connection on the line 102 to the splitter unit 900, while an information-signal is transmitted via the down-link connection on the line 102 from the splitter unit 900 to the splitter unit S3. The UP/DOWN-splice-unit 916 serves now for transmitting the switching-over-command-signal via the up-link connection and the output 921 to the processing unit 925. Because of the switching-over-command-signal the processing unit 925 changes the content of the loop-through-table 926, as described, and generates a switching-over-command-signal via the line 931 (for an upstream located splitter unit: if the splitter unit 900 would be the splitter unit S3, then the switching-over-command generated by the processing unit 925 on the line 931 for transmission to the splitter unit S1 is meant).

The UP/DOWN-signal-combination-unit 907 receives via its input 909 this switching-over-command-signal and supplies this signal in the up-link connection on the line 932.

Furthermore this UP/DOWN-signal-combination-unit also serves for forwarding the transmission-signal received via the down-link connection of the line 932 to the down-link connection and for offering forwarding the transmission-signal via its output 908 of the demultiplexing-unit 910. In dependence of the control signals, which are send by the processing unit 925 via the connection 930 to the demultiplexing-unit 910, the first, second (and were applicable multiple) information-signals are derived from the transmission-signal (see FIGS. 3A, 4A, 4B or FIGS. 12A, 12B) and provided via the outputs 911 to 914 (depending on which information signal shall be received by which receiver/splitter unit).

The UP/DOWN-splice-unit (such as, e.g., 916) serve also for supplying the information-signals to the outputs 911 to 914 of the demultiplexing-unit 910 in the down-link connections of the lines 103,102, . . . .

In a further elaborated embodiment of the splitter unit according FIG. 19, the splitter unit is arranged as "final splitter unit" in the transmission chain in an apartment building and may then be provided with at least two output terminals 902 and 903 for feeding two information-signals to two set-top-boxes respectively two television sets in the apartment building, e.g., when the resident of a building has a (television program-net) subscription with a Service-Provider having a preset maximum (total-) data-rate and, e.g., two television sets, on which two different television programs are watched were applicable having associated set-top-boxes having the outputs 902 respectively 903 interposed. A first television program (respectively a first information-signal) is provided by the splitter unit via the output terminal 902 and a second television program (respectively a second information-signal) is provided by the splitter unit via the output terminal 903.

Both information-signals have a certain data-rate, whereby the sum thereof does not exceed the predetermined maximum data-rate. Now the first television set, which is connected to the output terminal 902, is switched off. A switching-off-command-signal for switching-off the (first) information-signal being transmitted to the first television set is generated by the first television set and transmitted via the terminal 902 at the splitter unit via the UP/DOWN-splice-unit 915, from which the up-link connection 103 of output 920 is out-bound, to the processing unit 925.

The processing unit 925 is provided with additional intelligence and generates, in response to the reception of the switching-off-command-signal, n sub-switching-over-command-signals for switching-off the n sub-data-streams of the first information-signal and transmits these n sub-switching-over-command-signals via the line 930 to the demultiplexing unit 910, for that the first information-signal is no longer provided to the output 911. Likewise the content of the loop-through-table 926 is changed accordingly.

In that the first information-signal is switched-off, a portion of the predetermined maximum data-rate is not used. Now, it is possible that the second information-signal (the second television signal), which is transmitted via the output terminal 903 to the second television set, is transmitted in a higher quality (e.g., HD instead of SD) having a higher data-rate to the television set. When the processing unit 925 determines, that sufficient transmission capacity is available allowing for a switching-over from a second information-signal (in SD) to a third information-signal (in HD), the processing unit 925 generates as a reaction to the receipt of the switching-off-command-signal in respect to the first information-signal, n sub-switching-over-command-signals for switching-off all n sub-data-streams of the second information-signal and n sub-switching-on-command-signals for switching-on the reception of all n sub-data-streams of the third information-signal. The sequence of the switching-on and off commands, occurs as described before, so that a seamless switching-over is enabled.

If the third information-signal is already available on the up-link line 932, the processing unit 925 transmits these n sub-switching-on-command-signals via the line 930 to the demultiplexing unit 910. If the third information-signal is not yet available on the line 932, the n sub-switching-on-command-signals are forwarded via the line 931 to the UP/DOWN signal-combination-unit 907 and passed on via the terminal 901 to splitter units arranged upstream in the network, which then allow for switching-over to the forwarding of the third information-signal. The content of the loop-through-table 926 is likewise changed in accordance thereto.

FIG. 20 shows an embodiment of a receiver according to the invention, such as e.g. the receiver REC3. The receiver REC3 is here in the form of a set-top-box 1009, which is coupled to an upstream-located television set 1010. The set-top-box 1009 may where applicable integrated in the television set. In that case, the receiver REC3 consists of a combination of the set-top-box 1009 and the television set 1010.

The set-top-box 1009 comprises an UP/DOWN signal-combination-unit 1002 (also referred to herein as a "merging unit") having a terminal 1001 which is coupled to a terminal 1000 of the set-top-box. The terminal 1000 is coupled via line 106 to the splitter unit S3 (see also FIGS. 1 and 19). The UP/DOWN signal-combination-unit 1002 is in addition provided with an input terminal 1004 and an output terminal

1003. The terminal 1003 is coupled with an input terminal 1005 of a decoding unit 1006 (DEC), and the decoding unit comprises an output terminal 1007, which is coupled to an output terminal 1008 of the set-top-box 1009. The set-top-box comprises also an infrared (IR)—receiver 1012 for receiving infrared—signals of a remote control 1020 (RC). An output 1013 of the IR-receiver 1012 is coupled to an input 1014 of a converting unit 1011 (CONV) (also referred to herein as a "switching-over command generator unit"), whereby an output 1015 of the converting unit is coupled to the input terminal 1004. The receiver 1009 operates under influence of a timing unit 1019.

The UP/DOWN signal-combination-unit 1002 serves for forwarding the transmission-signal received via the downlink connection of the line 106 via the output 1003 to the decoding unit 1006. The decoding unit 1006 decodes the transmission-signal such that the video-information of the received A and B IP-packets (or the C and D IP-packets or the E and F IP-packets) are extracted and transmitted as a television signal via the output 1008 to the television set 1010 for display on the screen (not shown) of the television set 1010.

Assume now, that the receiver receives the first information-signal (television program) and thereby receives A and B IP-packets having the video information of the first information-signal. Now, it is switched-over to the reception of the second information-signal. A switching-over-command-signal "switch-over to reception of the second information-signal" is generated in the remote control 1020 and transmitted via the IR-Connection to the IR-Receiver 1012. The converting unit 1011 converts this switching-over-command-signal into subsequent two switching-over-commands: "request from now on the reception of C-packets of the second information-signal" and "request from now on the reception of D-packets of the second information-signal", under influence of the timing unit 1014 and in a sequence as described with respect to FIG. 5 respectively 9.

The UP/DOWN-signal-combination-unit 1002 receives via its input terminal 1004 these switching-over-command-signals and supplies these signals in the up-link connection on the line 106.

In case that the receiver is constructed according to prior art, the receiver does not comprise the converting unit 1011 and therefore the switching-over-command-signal "request from now on the reception of the second information-signal" is supplied by the UP/DOWN-signal-combination-unit 1002 via the up-link connection 106. Then the splitter unit 106 receives this switching-over-command-signal, which is derived by an UP/DOWN-splice-unit (such as 921 in FIG. 19) in the splitter unit 106 (900 in FIG. 19) from the transmission-signal and transmitted to its processing unit (925 in FIG. 19). The processing unit of this splitter unit is furthermore adapted to convert this switching-over-command-signal into subsequent switching-over-commands: "request from now on the reception of C-packets of the second information-signal" and "request from now on the reception of D-packets of the second information-signal". This occurs in the sequence as described with respect to FIG. 5 respectively 9.

Until now the invention has been described with respect to embodiments in which the information-signals are each distributed to two sub-data-streams. However, the invention is not limited thereto. The invention relates as well to embodiments in which the information-signals are distributed to n≥3 sub-data-streams. Only in short and schematically this will be described for an embodiment (n=3) in FIG. 21.

FIG. 21 shows a first information-signal, which is transmitted in a distributed manner via three sub-data-streams CH1, CH2, CH3. Signal-blocks SB1.1, SB1.4, SB1.7, . . . are forming the first sub-data-stream CH1. Signal-blocks SB1.2, SB1.5, . . . are forming the second sub-data-stream CH2. Signal-blocks SB1.3, SB1.6, . . . are forming the third sub-data-stream CH3. A second information-signal is likewise distributed to three sub-data-streams CH4, CH5, CH6 and transmitted. Signal-blocks SB2.1, SB2.4, SB2.7, . . . are forming the fourth sub-data-stream CH4. Signal-blocks SB2.2, SB2.5, . . . are forming the fifth sub-data-stream CH5. Signal-blocks SB2.3, SB2.6, . . . are forming the sixth sub-data-stream CH6.

At the point in time $T_s$ it is switched-over from the reception of the first information-signal to the reception of the second information-signal, compare switching-over-signal SW in FIG. 21. If the switching-over-signal arrives early enough in the time-interval in which the signal-block SB1.1 is received, then the second channel may be switched off and the fifth channel may be switched on for reception of the signal-block SB2.2 in due time. Likewise the channel CH3 may be switched off and the reception of the sixth channel may be requested. After lapse of reception of the signal-block SB1.1 via the channel CH1 this channel may likewise switched off and the reception of the channel CH4 may be requested. This switching-over is in FIG. 21 indicated by (a).

If the switching-over-signal arrives too late in the time-interval in which the signal-block SB1.1 is received, then also the signal-block SB2.2 is received via the channel CH2. After the switching-over-command the third channel may already be switched off and the sixth channel may be switched on. After receiving the signal-block SB1.1 the first channel may be switched off and the fourth channel may be switched on. After reception of the signal-block SB1.2 the signal-block SB2.3 is received via the sixth channel and the second channel is switched off as well as the fifth channel is switched on. This switching-over is indicated in FIG. 21 by (b).

FIG. 22 shows another embodiment of a splitter unit. The splitter unit 1100 in FIG. 22 looks like the splitter unit 900 in FIG. 19. Elements in FIG. 22 which are indicated by a reference numeral 11xy may generally realize the same functions as an element which is indicated in FIG. 19 by 9xy. In the splitter unit 1100 an arrangement 1150 is provided for determining the reception quality of an information-signal. This arrangement 1150 has therefore at least an input 1151, which is coupled to the line 1152. For determining the reception quality of the information-signals on the other lines 1153, 1154 and 1155 may likewise provided with connections to respective inputs of the arrangement 1150. For clarity these connections are not shown here. The arrangement 1150 therefore determines the reception quality of the information-signal via the line 1152. The reception quality may, e.g., be determined in that the loss of packets (packet loss) in the received information-signal is measured. When the reception quality falls below a certain threshold (the loss of packets is therefore to high) the data-rate of the received information-signal is obviously too high for the transmission chain between transmitter and receiver. Therefore, it should be switched over to an information-signal having a lower data-rate: For example, from an information-signal in HD quality to the same information-signal, however in SD quality having a lower data-rate compared to the HD quality. Therefore, the arrangement generates a switching-over-command-signal at the output 1156, for switching-over to an information-signal having lower (SD) quality/data rate. This switching-over-command-signal is supplied to the input 1157 of the processing unit 1125. This unit generates in response to the reception of the switching-over-command-signal n sub-command-signals and provides these via the output 1125 to the input 1109 of the UP/DOWN-signal-combination-unit 1107. Hereby it is assumed that the information-signals are transmitted in n sub-data-streams via the network. The switching-over to the reception of the information-signal having lower band-width (respectively data-rate) may not occur as described above.

It is also self-evident that, when the arrangement 1150 determines that the reception quality is such that enough band-width is available allowing for a receiving an information-signal having higher quality (e.g. the information-signal on the line 1152 is an information-signal in SD quality and the arrangement 1150 determines that there is enough band-width available for receiving an information-signal in HD quality) the arrangement 1150 may generate a second switching-over-command-signal which initiates a switching-over to an information-signal having higher image quality.

Also here, it is noted that the above mentioned switching-over on basis of the reception quality does not need to be necessarily performed in a splitter unit. Likewise the operation may also be executed in the receiver. Than the receiver is provided with the arrangement for determining the reception quality of the received information-signal and with the arrangement for generating n sub-switching-over-command-signals for supplying the n sub-switching-over-commands to an up-link terminal.

Likewise the splitter unit circuit may be arranged as shown in FIG. 22 as 'final splitter unit in the transmission chain' in an apartment building. Then the splitter unit may be provided with only one output terminal, such as the terminal 1105 for transmitting the information-signal to a set-top-box or directly to a television set. The splitter unit according to FIG. 22 may also be provided with a plurality of outputs 1102, . . . 1105; for that plural information-signals may be fed to different set-top-boxes respectively televisions sets in the apartments. The signal at the output terminal 1105 respectively the signals at the output terminals n 1102 to 1105 may then be implemented as a serial information-signal. As an example, the signal at an output terminal may be a standard-compatible television signal.

In addition, it is noted that the information signal may apart from the known television signals may also concern any other multimedia-based signal, such as, e.g., audio signals.

The invention claimed is:

1. A method of transmitting and receiving a first information-signal, which is transmitted via a network from a transmitter to a receiver, whereby the first information-signal consists of a sequence of subsequent signal-blocks, whereby transmission of the first information-signal is realized by means of n sub-data-streams, whereby n being an integer, whereby n≥2, whereby within subsequent groups of n subsequent signal-blocks of the first information-signal the first signal-blocks within the groups forming a first sub-data-stream, which first sub-data-stream is transmitted via a first channel of the network, whereby the second signal-blocks within the groups forming a second sub-data-stream, which second sub-data-stream is transmitted via a second channel, and in case n>2, the $n^{th}$ signal-blocks within the groups forming a $n^{th}$ sub-data-stream, which $n^{th}$ sub-data-stream is transmitted via a $n^{th}$ channel of the network, whereby a switching-over to reception of a second information-signal takes place, whereby the second information-signal is formed of a sequence of subsequent signal-blocks, whereby transmission of the second information-signal is realized also via n sub-data-streams, whereby in subsequent groups of n subsequent signal-blocks of the second information-signal, the first signal-blocks within the groups forming a $(n+1)^{th}$ sub-data-stream, whereby the $(n+1)^{th}$ sub-data-stream is transmitted via a $(n+1)^{th}$ channel of the network, whereby the second signal-blocks within the groups forming a $(n+2)^{th}$ sub-data-stream, which $(n+2)^{th}$ sub-data-stream is transmitted via a $(n+2)^{th}$ channel, and in case n≥2, the $n^{th}$ signal-blocks within the groups forming a $2n^{th}$ sub-data-stream, whereby the $2n^{th}$ sub-data-stream is transmitted via a $2n^{th}$ channel of the network, whereby for n=2, the following steps are preformed while switching-over is performed in dependence of a switching-over-command which is generated within a first time-interval, within which said first signal-block of a group of signal-blocks of the first information-signal is received, the first signal-block of the group of the first information-signal is received within the first time-interval via the first channel, after the switching-over-command the connection via the second channel is switched-off and a connection via the fourth channel is requested, a signal-block of the sequence of signal-blocks of the second information-signal is received within the second time-interval following the first time-interval via the fourth channel, within the second time-interval the connection via the first channel is switched-off and a connection via the third channel is requested, a subsequent signal-block of the sequence of signal-blocks of the second information-signal is received within the third time-interval following the second time-interval via the third channel.

2. The method according to claim 1, wherein in case that the remaining time of the first time-interval after the switching-over-command is too short for requesting connection via the fourth channel, the first signal-block of the group of the first information-signal is received within the first time-interval, the second signal-block of the group of the first information-signal is received within the second time-interval following the first time-interval ($\Delta T3$) via the second channel, within the second time-interval the connection via the first channel is switched-off and the connection via the third channel is requested, a signal-block of the sequence of subsequent signal-blocks of the second information-signal is received within a third time-interval ($\Delta T5$) following the second time-interval via the third channel, within the third time-interval the connection via the second channel is switched-off and within the third time-interval the connection via the fourth channel (CH4) is requested, a subsequent signal-block of the sequence of subsequent signal-blocks of the second information-signal is received within the fourth time-interval following the third time-interval.

3. The method according to claim 1, wherein the network is a multicast network.

4. The method according to claim 1, wherein the signal-blocks each comprise a group of pictures of a video signal.

5. The method according to claim 1, wherein the signal-blocks each consist of a plurality of IP packets.

6. The method according to claim 5, wherein the channels differ from each other in that the destination addresses of the IP-packets in the signal-blocks are conforming to each other within a sub-data-stream, but differ with respect to another conforming destination addresses of the IP-packets in the signal-blocks of another sub-data-stream, which is transmitted via another channel.

7. The method according to claim 1, wherein time-aligned signal-blocks in the first and second information-signals have a same time-length.

8. The method according to claim 1, wherein one of the first and second information-signals is a SD video-signal and that the other of the both information-signals is a HD video-signal.

9. The method according to claim 1, wherein the transmitter and a receiver are coupled to each other via one or more splitter units within the network.

10. A splitter unit for use within a method according to claim 9, provided with an up-link terminal and at least a down-link terminal for supplying an information-signal, wherein the splitter unit is adapted to receive the n sub-data-streams of the first information-signal via the up-link terminal, the splitter unit further being provided with an arrangement for determining the reception quality of the first information-signal, and with an arrangement for generating n sub-switching-over-command-signals for supplying the n sub-switching-over-command-signals to the up-link terminal, whereby when detecting that the reception quality of the first information-signal is below a predetermined threshold the arrangement for determining is arranged for generating a switching-over-command-signal for switching-over to the reception of a second information-signal having a lower band-width, and the arrangement for generating is further adapted to generate the n sub-switching-over-command-signals in response to the reception of the switching-over-command-signal, whereby n≥2.

11. A splitter unit for use within a method according to claim 9, provided with an up-link terminal and at least a first and second down-link terminal for supplying of at least two information-signals, wherein the splitter unit is adapted for receiving the n sub-data-streams of the first and the second information-signal via the up-link terminal, and is adapted to supply the first information-signal to the first down-link terminal and the second information-signal to the second down-link terminal, the splitter unit being further provided with an arrangement coupled to the down-link terminals for receiving via one of the first or second down-link terminal a switching-off-command-signal for switching-off the reception of the first respectively second information-signal via the first respectively second down-link terminal, and for generating in response to the reception of this switching-off-signal n sub-switching-over-command-signals for switching-off the reception of the first respectively second information-signal and for generating n sub-switching-over-command-signals for switching-over of reception from the second respectively first information-signal to the reception of a third information-signal having a higher band-width than the second respectively first information-signal, and the splitter unit is further adapted to supply the third information-signal to the second respectively first down-link terminal, whereby n≥2.

12. A receiver for use within a method according to claim 1, provided with an up-link terminal and at least an output terminal for supplying an information-signal, wherein the receiver is adapted to receive the n sub-data-streams of the first information-signal via the up-link terminal, the receiver being further provided with an arrangement for determining the reception quality of the first information-signal, and with an arrangement for generating n sub-switching-over-command-signals for supplying the n sub-switching-over-command-signals to the up-link terminal, whereby when detecting that the reception quality of the first information-signal is below a predetermined threshold the arrangement for determining is arranged for generating a switching-over-command-signal for switching-over to the reception of a second information-signal having a lower band-width, and the arrangement for generating is further adapted to generate the n sub-switching-over-command-signals in response to the reception of the switching-over-command-signal, whereby n≥2.

13. A splitter unit for use within a method according to claim 1, provided with an up-link terminal and at least a first and second down-link terminal for supplying at least two information-signals, wherein the splitter unit is adapted to receive the n sub-data-streams of the first and second information-signal via the up-link terminal, and is adapted to supply the first information-signal to the first down-link terminal and the second information-signal to the second down-link terminal, the splitter unit being further provided with an arrangement which is coupled to the down-link terminals for receiving either via the first or the second down-link terminal a switching-off-command-signal for switching-off reception of the first respectively second information-signal via these first respectively second down-link terminal, and for generating a response on reception of this switching-offs-signal of n sub-switching-over-command-signal for switching-off the reception of the first respectively second information-signal and for generating of n sub-switching-over-command-signals for switching-over reception of the second respectively first information-signal to reception of a third information-signal having a higher band-width than the second respectively first information-signal, and the splitter unit is further adapted to supply the third information-signal to the second respectively first down-link terminal, whereby n≥2.

14. A receiver for use within a method according to claim 1, provided with an up-link terminal and at least an output terminal, wherein the receiver is adapted to
  receive a switching-over-command, the receiver further comprising a converter unit, which converter unit is adapted to
  convert the switching-over-command into n sub-switching-over-command-signals, and
  supply the n sub-switching-over-command-signals to the up-link terminal, the receiver further comprising a merger unit, which merger unit is adapted to
  convert the n sub-data-streams of an information-signal in a serial information-signal, and to
  supply the serial information-signal to the output terminal, whereby n≥2.

15. A method of transmitting and receiving a first information-signal, which is transmitted via a network from a transmitter to a receiver, whereby the first information-signal consists of a sequence of subsequent signal-blocks, the transmission of the first information-signal is realized by means of n sub-data-streams, whereby n being an integer and n>2, whereby in subsequent groups of n subsequent signal-blocks of the first information-signal, the first signal-blocks within the groups are forming a first sub-data-stream, which first sub-data-stream is transmitted via a first channel of the network, whereby the second signal-blocks within the groups are forming a second sub-data-stream, which second sub-data-stream is transmitted via a second channel, and the $n^{th}$ signal-blocks within the groups are forming a $n^{th}$ sub-data-stream, which $n^{th}$ sub-data-stream is transmitted via $n^{th}$ channel of the network, whereby a switching-over to reception of a second information-signal takes place, whereby the second information-signal consists of a sequence of subsequent signal-blocks, whereby transmission of the second information-signal is performed also via n sub-data-streams, whereby in subsequent groups of n subsequent signal-blocks of the second information-signal the first signal-blocks within the groups forming a $(n+1)^{th}$ sub-data-stream, which $(n+1)^{th}$ sub-data-stream is transmitted via a $(n+1)^{th}$ channel of the network, whereby the second signal-blocks within the groups forming a $(n+2)^{th}$ sub-data-stream, which $(n+2)^{th}$ sub-data-stream is transmitted via a $(n+2)^{th}$ channel, and the $n^{th}$ signal-blocks within the groups forming a $2n^{th}$ sub-data-stream, which $2n^{th}$ sub-data-stream is transmitted via a $2n^{th}$ channel of the network, whereby the following steps are performed while switching-over, in dependence of a switching-over-command which is generated within a first time-interval, within which a first signal-block of a group of signal-blocks of the first information-signal is received, The first signal-block of the group of signal-blocks of the first information-signal is received within the first time-interval via the first channel, After the switching-over-command the connections via the second and higher channels, via which the first information-signal is transmitted, are switched-off and the connection via the $(n+2)^{th}$ to $2n^{th}$ channels is requested, a second signal-block of a group of signal-blocks of the second information-signal is received within a second time-interval following the first time-interval via the $(n+2)^{th}$ channel, after the first time-interval the connection via the first channel is switched off and the connection via the $(n+1)^{th}$ channel is requested, a $m^{th}$ signal-block of the group of signal-blocks of the second information-signal is received within the $m^{th}$ time-interval following the $(m-1)^{th}$ time-interval via the $(n+m)^{th}$ channel, whereby m being an integer and $3 \leq m \leq n$, the first signal-block of the subsequent group of signal-blocks of the second information-signal are received within the $(n+1)^{th}$ time-interval following the $n^{th}$ time-interval via the $(n+1)^{th}$ channel.

16. The method according to claim 15, wherein in case that the remaining time of the first time-interval after the switching-over-command is too short for requesting connection via the $(n+2)^{th}$ channel, the first signal-block of the group of the first information-signal is received within the first time-interval via the first channel, the second signal-block of the group of the first information-signal is received within the second time-interval following the first time-interval via the second channel, after the switching-over-command the connections via the third and higher channels, via which the first information-signal is transmitted, are switched-off and the connection via the $(n+3)^{th}$ to $2n^{th}$ channels is requested, a third signal-block of a group of the second information-signal is received within a third time interval following the second time-interval via the $(n+3)^{th}$ channel, after the first time-interval the connection via the first channel is switched-off and the connection via the $(n+1)^{th}$ channel is requested, after the second time-interval the connection via the second channel is switched-off and the connection via the $(n+2)^{th}$ channel is requested, if n>3, a $m^{th}$ signal-block of the group of the second information-signal is received within $m^{th}$ time-interval following the $(m-1)^{th}$ time-interval via the $(n+m)^{th}$ channel, whereby m being an integer and $4 \leq m \leq n$, the first signal-block of the subsequent group of the second information-signal is received within the $(n+1)^{th}$ time-intervals following the $n^{th}$ time-intervals via the $(n+1)^{th}$ channel, and the second signal-block of the subsequent group of the second information-signal is received within the $(n+2)^{th}$ time-interval following the $(n+1)^{th}$ time-interval via the $(n+2)^{th}$ channel.

\* \* \* \* \*